(12) United States Patent
Ma et al.

(10) Patent No.: US 11,501,518 B2
(45) Date of Patent: Nov. 15, 2022

(54) FINE-GRAINED IMAGE RECOGNITION METHOD, ELECTRONIC DEVICE AND STORAGE MEDIUM

(71) Applicant: Beijing University of Posts and Telecommunications, Beijing (CN)

(72) Inventors: Zhanyu Ma, Beijing (CN); Dongliang Chang, Beijing (CN); Jiyang Xie, Beijing (CN); Yifeng Ding, Beijing (CN); Zhongwei Si, Beijing (CN)

(73) Assignee: Beijing University of Posts and Telecommunications, Beijing (CN)

(*) Notice: Subject to any disclaimer, the term of this patent is extended or adjusted under 35 U.S.C. 154(b) by 282 days.

(21) Appl. No.: 17/039,346

(22) Filed: Sep. 30, 2020

(65) Prior Publication Data

US 2021/0133479 A1 May 6, 2021

(30) Foreign Application Priority Data

Nov. 5, 2019 (CN) .......................... 201911072231.2

(51) Int. Cl.
*G06V 10/46* (2022.01)
*G06T 7/50* (2017.01)
(Continued)

(52) U.S. Cl.
CPC .......... *G06V 10/462* (2022.01); *G06K 9/628* (2013.01); *G06K 9/629* (2013.01); *G06K 9/6256* (2013.01);
(Continued)

(58) Field of Classification Search
CPC .......... G06K 9/628; G06K 9/629; G06N 3/08; G06N 3/0454
See application file for complete search history.

(56) References Cited

U.S. PATENT DOCUMENTS

2021/0233513 A1* 7/2021 Su .............................. G06N 3/08

FOREIGN PATENT DOCUMENTS

| CN | 107346328 | 11/2017 |
| CN | 107480261 | 12/2017 |
| CN | 109359684 A | 2/2019 |
| CN | 109583481 | 4/2019 |

(Continued)

OTHER PUBLICATIONS

First Office Action and Search Report, issued in the corresponding Chinese patent application No. 201911072231.2, dated Apr. 16, 2020, 12 pages, with the English translation.
(Continued)

*Primary Examiner* — Ross Varndell
(74) *Attorney, Agent, or Firm* — Hamre, Schumann, Mueller & Larson, P.C.

(57) ABSTRACT

The present disclosure provides a fine-grained image recognition method, an electronic device and a computer readable storage medium. The method comprises the steps of feature extraction, calculation of feature discriminant loss function, calculation of feature diversity loss function and calculation of model optimization loss function. The present disclosure comprehensively considers influences of factors such as a large intra-class difference, a small inter-class difference, and a great influence of background noise of the fine-grained image, and makes constrains such that the feature maps belonging to each class are discriminative and have the features of corresponding class, thus reducing the intra-class difference, decreasing the learning difficulty and learning better discriminative features. The constraints make the feature maps belonging to each class have a diversity, which increases the inter-class difference, achieves a good result, and is easy for practical deployment, thereby obviously improving the effect of multiple fine-grained image classification tasks.

19 Claims, 3 Drawing Sheets

(51) Int. Cl.
  *G06K 9/62* (2022.01)
  *G06N 3/04* (2006.01)
  *G06N 3/08* (2006.01)
(52) U.S. Cl.
  CPC ................ *G06N 3/04* (2013.01); *G06N 3/08* (2013.01); *G06T 7/50* (2017.01); *G06T 2207/20081* (2013.01); *G06T 2207/20084* (2013.01)

(56) References Cited

FOREIGN PATENT DOCUMENTS

| CN | 110136149 | 8/2019 |
| CN | 110222641 | 9/2019 |

OTHER PUBLICATIONS

Supplementary Search Report, issued in the corresponding Chinese patent application No. 201911072231.2, dated May 26, 2020, 3 pages with the English translation.

Zheng et al., "Learning Multi-Attention Convolutional Neural Network for Fine-Grained Image Recognition", IEEE, Computer Vision Foundation, Dec. 25, 2017, 9 pages.

Li et al., "Dual Cross-Entropy Loss for Small-Sample Fine-Grained Vehicle Classification", IEEE Transactions on Vehicular Technology, vol. 68, No. 5, May 2019, 9 pages.

Ma et al., "Fine-Grained Vehicle Classification With Channel Max Pooling Modified CNNs", IEEE Transactions on Vehicular Technology, vol. 68, No. 4, Apr. 2019, 10 pages.

\* cited by examiner

FINE-GRAINED IMAGE RECOGNITION METHOD, ELECTRONIC DEVICE AND STORAGE MEDIUM

CROSS-REFERENCE OF RELATED APPLICATION

This application claims priority of Chinese Patent Application No. CN201911072231.2 filed on Nov. 5, 2019, the content of which is incorporated herein by reference as if being fully set forth.

TECHNICAL FIELD

The present disclosure relates to the field of image recognition technologies, and particularly to a fine-grained image recognition method, an electronic device and a storage medium.

BACKGROUND

The fine-grained objects are widely existed in the real life, and corresponding fine-grained image recognition is an important issue in the computer vision recognition while being greatly demanded in the daily life. At present, there are three main challenges in the fine-grained image recognition: 1) the images of the same class have large intra-class differences due to factors such as shape, background and occlusion; 2) the images of different classes have small inter-class differences since they belong to a same large class; and 3) it takes time and effort to collect and annotate the fine-grained images. The left and right pictures in FIG. 6 illustrate vehicles manufactured by two manufacturers separately, wherein each row of the left picture illustrates vehicles of a same model, and each row of the right picture illustrates vehicles of a same model. As can be seen from FIG. 6, the fine-grained classification has the characteristics of large intra-class differences and small inter-class differences.

SUMMARY

The present disclosure proposes a fine-grained image recognition method, an electronic device and a storage medium, so as to improve accuracy of fine-grained image recognition.

In order to achieve the above objective, the present disclosure adopts the following solutions:

According to an aspect of the present disclosure, there is provided a fine-grained image recognition method, comprising:

forming a feature extraction network based on a network structure of convolutional neural network, by pre-training weights on a training dataset; inputting an input image into the feature extraction network to obtain corresponding depth features;

dividing the depth features into a set number of groups, and randomly discarding depth features of a set proportion in each group of depth features; taking maximum values of the remaining depth features in each group of depth features at corresponding positions to obtain salient features corresponding to each group of depth features; averaging all elements of each of the salient features to obtain predicted values of corresponding classes; and calculating a multi-classification cross-entropy for the obtained predicted values to obtain a depth feature discrimination loss;

performing a softmax on respective channels of each of the depth features to obtain normalized depth features; taking maximum values at corresponding positions of each group of normalized depth features to obtain normalized salient features corresponding to each group of normalized depth features; summing values of each group of normalized salient features to obtain a diversity of the group of normalized salient features; averaging the diversities of a plurality of groups of normalized salient features to obtain a feature diversity loss;

calculating a multi-classification cross-entropy loss of the depth features; and weighted fusing the multi-classification cross-entropy loss, the depth feature discrimination loss and the feature diversity loss to obtain a model optimization loss function;

training a model comprising the feature extraction network and a classifier network using the model optimization loss function to obtain a fine-grained image recognition model; and using the fine-grained image recognition model to perform an image recognition on an image to be recognized to obtain a class recognition result.

According to another aspect of the embodiments of the present disclosure, there is provided an electronic device, comprising a memory, a processor and a computer program stored in the memory and executable on the processor, wherein the processor implements the steps of the method of the above embodiment when executing the program.

According to another aspect of the embodiments of the present disclosure, there is provided a computer readable storage medium, on which a computer program is stored, and when the program is executed by a processor, the steps of the method of the above embodiment are implemented.

The present disclosure has the following advantageous technical effects:

The present disclosure comprehensively considers influences of factors such as a large intra-class difference, a small inter-class difference, and a great influence of background noise of the fine-grained image, and through the feature discrimination loss function, the feature images belonging to each class are constrained to be discriminative and have the features of corresponding class, thus reducing the intra-class difference, decreasing the learning difficulty and learning better discriminative features. Through the new feature diversity loss function, the feature maps belonging to each class are constrained to have diversity, thus increasing the inter-class difference, further decreasing the model learning difficulty and learning more different features.

Based on the above two points, the present disclosure obtains more features which are more discriminative in the fine-grained image classification task, thus achieving beneficial effects. As compared with the existing methods, it is more targeted, better in effect, and easy for practical deployment. The present disclosure fully considers characteristics of fine-grained image classification, and obviously improves the effect of multiple fine-grained image classification tasks.

DETAILED DESCRIPTION

The technical solutions of the present disclosure will be described in detail as follows. It should be pointed out that the technical solutions of the present disclosure are not limited to the implementations described in the embodiments, and any improvement and design made on the basis of the present disclosure by persons skilled in the art with reference to the contents of the technical solutions of the present disclosure should fall within the protection scope of the present disclosure.

The existed fine-grained image recognition methods mainly achieve the purpose of recognition through three aspects: 1) locating local features in an image; 2) extracting discriminative features for image recognition; and 3) achieving a fine-grained image classification by combining global features and local features of an image.

For example, a bilinear pooling fine-grained image classification method extracts features through the pre-trained twin convolutional neural networks, and performs bilinear pooling on each channel level of the features, so as to obtain high-order representations of the features and depict detailed features in a target image. This method improves the accuracy of the fine-grained image recognition through a new pooling method. However, this method does not be effectively designed for fine-grained image recognition in terms of the relationship between fine-grained image classes, the amount of model parameters, and the number of detail regions, etc., and the influences of factors such as the fine-grained image containing a variety of detail information, small inter-class differences and large intra-class differences are not taken into account in this method.

For another example, a multi-attention convolutional neural network method extracts the features through the pre-trained convolutional neural networks, and clusters each channel of the features, so as to obtain componentized (detailed) representations of the features to depict a variety of detailed features of a target image class. This method improves the accuracy of the fine-grained image recognition through a new clustering method for the channels in the features. Although this method realizes the modeling of various detail information contained in the fine-grained image, it greatly increases the number of parameters of the model, and does not consider the relationship between various detail information, or build models of the intra-class and inter-class relationships. Therefore, when the fine-grained images vary widely, it is hard to obtain a good performance, and the practical deployment is very difficult.

In order to overcome the defects of the above technologies, the present disclosure provides a fine-grained image recognition method, which can improve the accuracy of the fine-grained image recognition based on a channel loss function.

Figure 1:
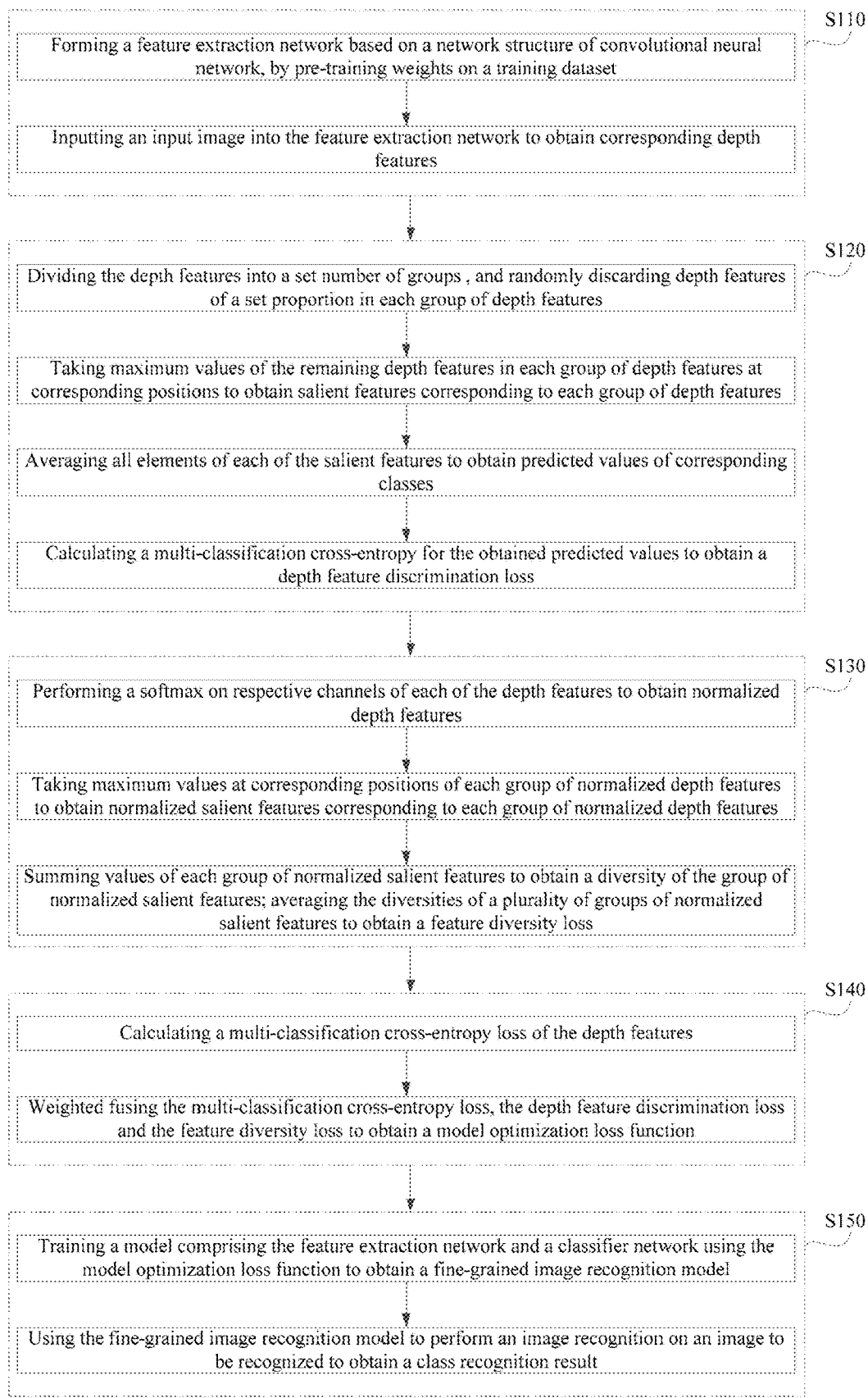
FIG. 1 is a schematic flowchart of a fine-grained image recognition method according to an embodiment of the present disclosure.

FIG. 1 is a schematic flowchart of a fine-grained image recognition method according to an embodiment of the present disclosure. Referring to FIG. 1, the fine-grained image recognition method of the embodiment may comprise the following steps S110 to S150.

The specific implementations of steps S110 to S150 will be described below.

Step S110: forming a feature extraction network based on a network structure of convolutional neural network, by pre-training weights on a training dataset; inputting an input image into the feature extraction network to obtain corresponding depth features.

In step S110, a feature extraction can be performed.

In step S110, the training dataset may be an ImageNet dataset or other dataset. The depth features may be feature maps. The convolutional neural network may comprise one of VGG, ResNet and Densenet.

Specifically, for example, the input image may be represented as $X \in R_{W \times H}$, wherein X represents the input image, $R^{W \times H}$ represents a real number set of W×H dimensions, W and H represent the width and the height of each of the depth features, respectively, and W×H represents a cross product of W and H.

For another example, the depth features extracted from the input image may be represented as $\mathcal{F} \in R^{N \times W \times H}$, wherein N represents the number of channels of the depth features, $R_{N \times W \times H}$ represents a real number set of N×W×H dimensions, and N×W×H represents a cross product of N, W, and H.

For another example, in a case of $N = c \times \xi$, a n-th dimensional feature map of the depth features extracted from the input image is represented as $\mathcal{F}_n \in R^{WH}$, n=1, 2, ..., N, wherein c represents the total number of classes in the training dataset, $\xi$ represents the number of feature maps assigned to each class, c×$\xi$ represents a cross product of c and $\xi$, $\mathcal{F}_n$ represents the n-th dimension feature map, and WH represents a dot product of W and H.

Step S120: dividing the depth features into a set number of groups, and randomly discarding depth features of a set proportion in each group of depth features; taking maximum values of the remaining depth features in each group of depth features at corresponding positions to obtain salient features corresponding to each group of depth features; averaging all elements of each of the salient features to obtain a predicted value of a corresponding class; and calculating a multi-classification cross-entropy for the obtained predicted values to obtain a depth feature discrimination loss.

In step S120, the depth feature discrimination loss (or referred to as a feature discrimination loss function) may be calculated, and the depth features obtained through the convolution neural network can have high-dimensional semantic information beneficial to the classification. Specifically, by dividing the depth features into a set number of groups and randomly discarding depth features of a set proportion in each group of depth features, a feature random attention selection may be performed. By taking maximum values of the remaining depth features in each group of depth features at corresponding positions to obtain salient features corresponding to each group of depth features, a feature saliency fusion may be performed. By averaging all elements of each of the salient features to obtain a predicted value of a corresponding class, a class predicted value may be obtained. By calculating a multi-classification cross-entropy for the obtained predicted values to obtain a depth feature discrimination loss, a multi-classification cross-entropy calculation may be performed.

Specifically, the grouped depth features may be represented as $\mathcal{F} = \{F_0, F_1, \ldots, F_i, \ldots F_{c-1}\}$ for example, wherein $F_i$ represents a depth feature belonging to the i-th class.

For another example, the depth feature belonging to the i-th class may be represented as $F_i \in R^{\xi \times WH}$, and $F_i = \{\mathcal{F}_{i \times \xi + 1}, \mathcal{F}_{i \times \xi + 2}, \ldots, \mathcal{F}_{i \times \xi + i}, \ldots, \mathcal{F}_{i \times \xi + \xi}\}$, wherein i=0, 1, 2, . . . , c−1; wherein $F_i$ represents the depth feature belonging to the i-th class, $R^{\xi \times WH}$ represents a real number set of ξ×WH dimensions, ξ×WH represents a cross product of ξ and WH, and $\mathcal{F}_{i \times \xi + i'}$ represents a feature belong to the i-th class and having ξ feature maps.

In step S120, the set number of groups may be equal to, or slightly larger or smaller than, the total number of classes in the training dataset. The set proportion for example may be equal to one half, or may be other proportional value.

In specific implementations, the depth features in each group of depth features may be discarded by a random attention mechanism. For example, in the case that the depth features are feature maps, in step S120, randomly discarding the depth features of a set proportion in each group of depth features may specifically comprise step S121: randomly discarding feature maps of a set proportion from the depth features corresponding to each class in the grouped depth features through a random attention mechanism.

More specifically, in step S121, the depth features in each group of depth features may be randomly discarded by performing a matrix operation on the depth features using a mask matrix in which 0 and 1 are randomly distributed. For example, after discarding the feature maps of a set proportion in the depth features corresponding to each class, the remaining depth features in each group of depth features may be represented as:

$$F'_i = M_i \times F_i,$$

$$M_i = \text{diag}(Mask_i),$$

wherein $F_i$ represents a depth feature belonging to an i-th class or group, $F'_i$ represents a remaining depth features in each group of depth features $F'_i$; $M_i$ represents an intermediate variable, $Mask_i$ is a mask matrix containing only 0 and 1 which are randomly distributed; $Mask_i \in R^\xi$, $R^\xi$ represents a real vector of ξ dimensions; and diag( ) is a matrix operation that converts a vector into a diagonal matrix. diag( ) can convert a vector into a main diagonal of a diagonal matrix. In this way, the channel attention to the depth features can be achieved.

In which, the set number of groups may be equal to the total number of classes in the training dataset, so the number i of classes may be the number of groups of the depth features having been grouped.

Further, in order to randomly discard one half of the depth features in each group of depth features, the mask matrix $Mask_i$ may comprise $$\left[\frac{\xi}{2}\right]$$

zeros and $$\left[\frac{\xi}{2}\right]$$

ones. $Mask_i$ may be composed of 0 and 1 each of a half proportion. In this way, through the random attention mechanism, the features $F_i$ corresponding to each class in the depth features F may be randomly discarded, and the depth features with the half number of channels may be discarded, thereby realizing the channel attention to the depth features.

In specific implementations, in a case where the depth features are feature maps, in step S120, taking maximum values of the remaining depth features in each group of depth features at corresponding positions to obtain salient features corresponding to each group of depth features specifically may comprise step S122: taking maximum values of the remaining depth features in each group of depth features at corresponding positions in different feature maps, and averaging maximum values at respective corresponding positions of the depth features in all the feature maps in the remaining depth features in each group of depth features to obtain salient features of each group of depth features.

For example, the salient feature of each group of depth features may be represented as:

$$g(F_i) = \underbrace{\frac{1}{WH} \sum_{k=1}^{WH}}_{GAP} \underbrace{\max_{j=1,2,\ldots,\xi}}_{CCMP} \underbrace{\frac{F'_{i,j,k}}{CWA}}_{}$$

wherein $g(F_i)$ represents the salient feature of each group of depth features $F_i$, $F'_{i,j,k}$ represents a value at position k in the feature map labeled as j in the depth features of an i-th class, ξ represents the number of feature maps assigned to each class, and $$\max_{j=1,2,\ldots,\xi}$$

represents taking a maximum value among values $F'_{i,j,k}$ with j as a variable, W and H represent the width and the height of each of the depth features respectively, and WH represents that W and H are multiplied.

The right side of the above equation is divided into three parts, and the three parts are called GAP (Global average pooling), CCMP (Cross-channel max pooling) and CWA (channel-wise attention) respectively, used to represent the implementation mechanism of corresponding calculation processes.

In step S120, all elements of each of the salient features are averaged to obtain a predicted value of a corresponding class. For example, the predicted value may be represented as:

$$pred = \frac{[e^{g(F_0)}, e^{g(F_1)}, \ldots, e^{g(F_i)}, \ldots e^{g(F_{c-1})}]^T}{\sum_{i=0}^{c-1} e^{g(F_i)}},$$

wherein pred represents the predicted value, c represents a total number of classes in the training dataset, T represents a transposition operation, and $g(F_i)$ represents the salient feature of each group of depth features $F_i$.

In step S120, a multi-classification cross-entropy is calculated for the obtained predicted value to obtain a depth feature discrimination loss, which for example may be represented as:

$$L_{dis}(F) = L_{CE}(y, \text{pred}),$$

wherein $L_{dis}(F)$ represents a depth feature discrimination loss, $L_{CE}$ represents a multi-classification cross-entropy loss, y represents a real class, and $L_{CE}(y, pred)$ represents that $L_{CE}$ is obtained from y and pred.

The multi-classification cross-entropy loss $L_{CE}$ may be a loss function calculated using the real class y and the predicted value pred, for example:

$$L_{CE}(y, pred) = -\ln pred_y,$$

wherein $pred_y$ represents a probability of predicting an input image (sample) as class y.

Step S130: performing a softmax on respective channels of each of the depth features to obtain normalized depth features; taking maximum values at corresponding positions of each group of normalized depth features to obtain normalized salient features corresponding to each group of normalized depth features; summing values of each group of normalized salient features to obtain a diversity of the group of normalized salient features; averaging the diversities of a plurality of groups of normalized salient features to obtain a feature diversity loss.

In step S130, the feature diversity loss function may be calculated. Through this step, the depth features obtained through the convolutional neural network can be differentiated.

In step S130, a softmax is performed on respective channels of each of the depth features to obtain normalized depth features. Specifically, for example, the obtained normalized depth features may be represented as:

$$F_i'' = \frac{e^{F_i}}{\sum_{k=1}^{WH} e^{F_{i,k}}},$$

wherein $F''_i$ represents a normalized depth feature, $F_i$ represents a depth feature belonging to an i-th class or group, and $F_{i,k}$ represents a value at position k of the depth feature of the i-th class. In which, the set number of groups may be equal to a total number of classes in the training data. In this case, the label i of the class is the label of the number of groups.

In step S130, maximum values are taken at corresponding positions of each group of normalized depth features to obtain normalized salient features corresponding to each group of normalized depth features. Specifically, for example, the obtained normalized salient features may be represented as:

$$\tilde{F}_i = \max_{j=1,2,\ldots,\xi} F''_{i,j},$$

wherein $\tilde{F}_i$ represents a normalized salient feature, j represents the label of the feature map in each group of normalized depth features $F_i$, $F''_{i,j}$ represents an j-th feature map in the normalized depth feature $F''_i$ of an i-th class, $\xi$ represents the number of feature maps assigned to each class, and $$\max_{j=1,2,\ldots,\xi}$$

represents taking a maximum value among the values $F''_{i,j}$ with j as a variable.

In specific implementations, in a case where the depth features are feature maps, in step S130, summing values of each group of normalized salient features to obtain a diversity of the group of normalized salient features specifically may comprise step S131: adding up the value of each position in the feature map in each group of normalized depth features to obtain a diversity of each group of normalized depth features.

More specifically, for example, the obtained diversity of each group of normalized depth features may be represented as:

$$h(F_i) = \sum_{k=1}^{WH} \tilde{F}_{i,k},$$

wherein $h(F_i)$ represents the diversity of each group of normalized depth features $F_i$, and $\tilde{F}_{i,k}$ represents a value at position k in the normalized salient feature $\tilde{F}_i$ of the i-th class.

In specific implementations, in step S130, averaging the diversities of a plurality of groups of normalized salient features to obtain a feature diversity loss specifically may comprise step S132: averaging the diversities of all the groups of normalized salient features to obtain the feature diversity loss. In other embodiments, other number of groups may be selected to obtain the feature diversity loss.

More specifically, for example, the obtained feature diversity loss may be represented as:

$$L_{div}(F) = \frac{1}{c} \sum_{i=0}^{c-1} h(F_i),$$

wherein $L_{div}(F)$ represents the feature diversity loss, and c represents a total number of classes in the training dataset.

Step S140: calculating a multi-classification cross-entropy loss of the depth features; and a weighted fusion is performed on the multi-classification cross-entropy loss, the depth feature discrimination loss and the feature diversity loss to obtain a model optimization loss function.

Through step S140, the model optimization loss function is obtained, i.e., more and better local or regional features of the input image are obtained through the feature discrimination loss and the feature diversity loss, which is important to well solve the task of fine-grained image classification.

In specific implementations, a classifier network in the following step S150 may be a fully connected layer. In this case, in step S140, calculating a multi-classification cross-entropy loss of the depth features specifically may comprise steps S141: taking the depth features as an input of the fully connected layer, and constraining high-dimensional semantic features of the depth features to obtain a multi-classification cross-entropy loss.

In the above step S140, for example, the obtained model optimization loss function may be represented as:

$$Loss(F) = L_c(F) + \mu L_{dis}(F) - \lambda L_{div}(F),$$

wherein F represents the depth feature, $L_{CE}(F)$ represents the multi-classification cross-entropy loss, $L_{dis}(F)$ represents the depth feature discrimination loss, $L_{div}(F)$ represents the feature diversity loss, Loss(F) represents the model optimization loss function, and μ and λ represent the non-negative multipliers.

Step S150: training a model comprising the feature extraction network and a classifier network using the model optimization loss function to obtain a fine-grained image recognition model; using the fine-grained image recognition model to perform image recognition on an image to be recognized to obtain a class recognition result.

In some embodiments, the method illustrated in FIG. 1 may further comprise step S170: fine-tuning the convolutional neural network to make the convolutional neural network be adaptive to a fine-grained classification task of an image of a set class. The set class may be, for example, commodity, vehicle, flower, etc. The fine-grained image recognition method of the embodiments of the present disclosure can perform a fine-grained classification on the images of a same set class, for example, classify vehicles into those of specific vehicle types.

Figure 2:
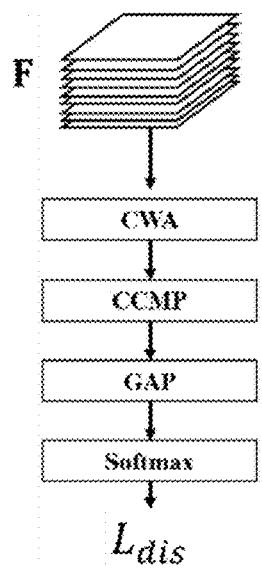
FIG. 2 is a schematic flowchart of a calculation of a feature discrimination loss function in a fine-grained image recognition method according to an embodiment of the present disclosure.
Figure 3:
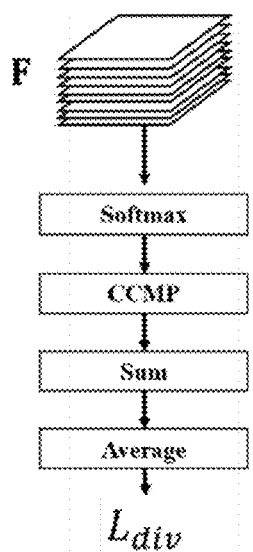
FIG. 3 is a schematic flowchart of a calculation of a feature diversity loss function in a fine-grained image recognition method according to an embodiment of the present disclosure.
Figure 4:
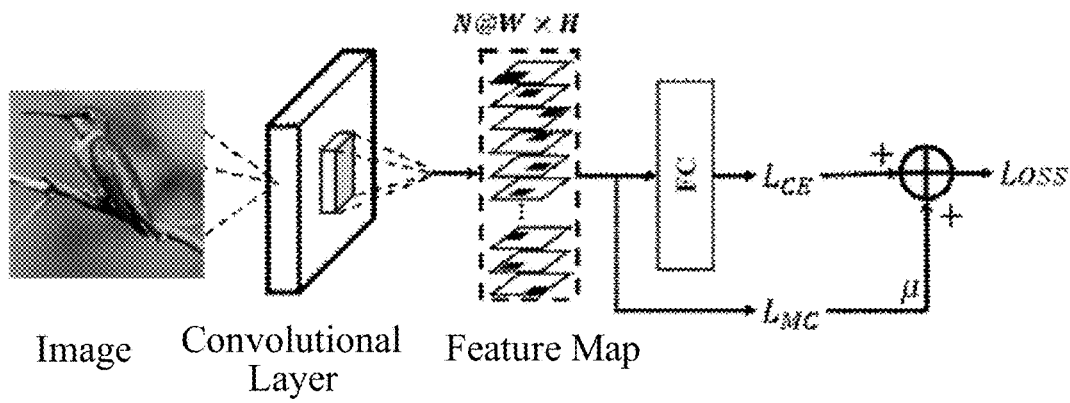
FIG. 4 is a schematic flowchart of a calculation of a model optimization loss function in a fine-grained image recognition method according to an embodiment of the present disclosure.
Figure 5:
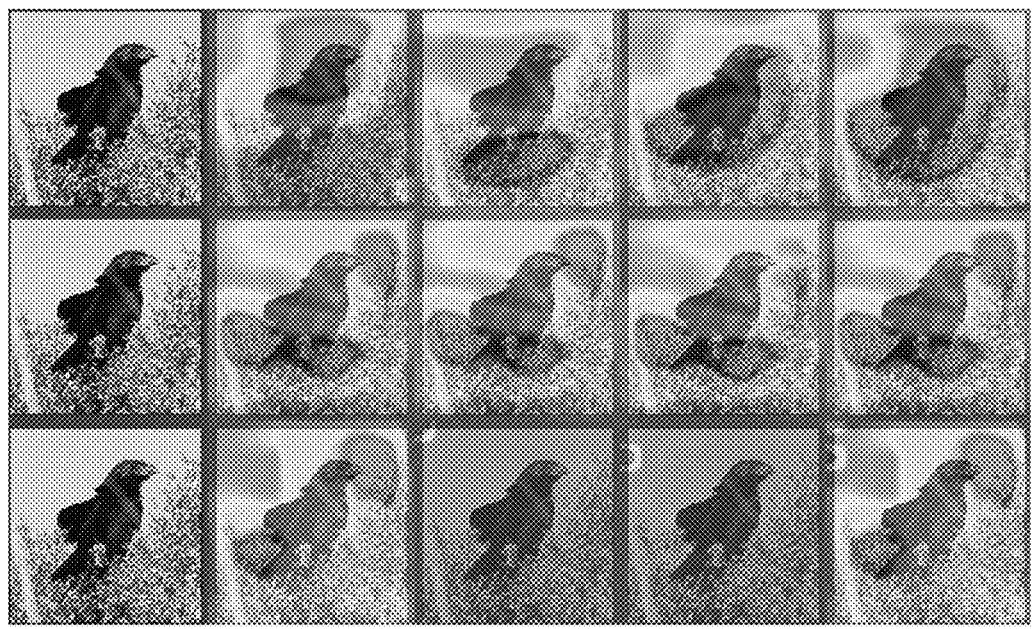
FIG. 5 is a schematic diagram of an example of feature visualization in a fine-grained image recognition method according to an embodiment of the present disclosure.
Figure 6:
FIG. 6 is a schematic diagram of collection and annotation of fine-grained images.

FIG. 2 is a schematic flowchart of a calculation of a feature discrimination loss function in a fine-grained image recognition method according to an embodiment of the present disclosure, FIG. 3 is a schematic flowchart of a calculation of a feature diversity loss function in a fine-grained image recognition method according to an embodiment of the present disclosure, FIG. 4 is a schematic flowchart of a calculation of a model optimization loss function in a fine-grained image recognition method according to an embodiment of the present disclosure, FIG. 5 is a schematic diagram of an example of a feature visualization in a fine-grained image recognition method according to an embodiment of the present disclosure, and FIG. 6 is a schematic diagram of collection and annotation of fine-grained images. As illustrated in FIGS. 2 to 6, in some embodiments, the fine-grained image recognition method based on the channel loss function may comprise the following steps I to IV.

Step I, step of feature extraction: forming a feature extraction network based on a network structure of convolutional neural network (CNN), by pre-training weights on an ImageNet dataset; inputting an input image into the feature extraction network to obtain corresponding depth features.

As an example, the convolutional neural network comprises one of VGG, ResNet and Densenet.

Further, the convolutional neural network may be adaptive to a specific task by fine tuning, i.e., a fine-tune operation.

Further, the input image is $X \in R_{W \times H}$, and the depth feature $F \in R^{N \times W \times H}$, corresponding to the input image is extracted, wherein N represents the number of channels of the depth feature, W and H represent the width and the height of each of the depth features, respectively; in addition, the number N of channels of the depth feature is equal to $c \times \xi$, wherein c represents a total number of classes in the training dataset, and $\xi$ represents the number of feature maps assigned to each class; therefore, a n-th dimensional feature map of the depth feature F may be represented as $F_n \in R^{WH}$, n=1, 2, ..., N.

As an example, the depth feature is a feature map.

Thus, the depth features belonging to the i-th class may be represented as $F_i \in R^{WH}$, wherein i=0, 1, 2, ..., c−1, i.e., $$F_i = \{F_{i \times \xi+1}, F_{i \times \xi+2}, \ldots, F_{i \times \xi+\xi}\}.$$

Thus, the grouped depth features F are obtained, i.e., $$F = \{F_0, F_1, \ldots, F_{c-1}\}.$$

Step II, calculating of a feature discriminant loss function. In this step, the depth features obtained through the convolution neural network can have high-dimensional semantic information beneficial to the classification; this step comprises:

A: feature random attention selecting step: classifying the depth features obtained in step I into c groups, and randomly discarding one half of the depth features in each group of depth features;

as an example, c is a total number of classes in the training dataset;

B: feature saliency fusing step: taking maximum values of the remaining features in each group of depth features at a same position to obtain salient features corresponding to each group of depth features;

C: class prediction value obtaining step: calculating an average value for each of the salient features to obtain a predicted value of corresponding class;

D: multi-classification cross-entropy calculating step: calculating a multi-classification cross-entropy for the obtained predicted value, i.e., obtaining a depth feature discrimination loss.

Further, the functional calculation of the depth feature discrimination loss comprises:

Step D1: randomly discarding features $F_i$ corresponding to each class in the depth features F obtained in step I through a random attention mechanism (CWA), to discard one half of the channels, i.e., $$F_i = \text{Mask}_i * F_i$$

$$\text{Mask}_i = \text{diag}(\text{Mask}_i)$$

wherein $\text{Mask}_i \in R^\xi$ is a mask matrix containing only 0 and 1 each of a half proportion; and diag( ) is a dot multiplication operation, thereby achieving the channel attention to the depth features;

Step D2: through the feature saliency fusion (Cross-channel max pooling, CCMP), taking maximum values of $F_i$ obtained by a selection through the feature random attention at relative positions of different feature maps, $$F_i = \max_{j=1,2,\ldots,\xi} M_i * F_{i,j},$$

$M_i$ represents a mask matrix $\text{Mask}_i$, and $F_{i,j}$ represents a j-th feature map of $F_i$.

Then the value at each position in the feature map is added up (GAP) to obtain the salient features of each group of features:

$$g(F_i) = \frac{1}{WH} \sum_{k=1}^{WH} \max_{j=1,2,\ldots,\xi} M_i * F_{i,j,k},$$

wherein $F_{i,j,k}$ represents position k in $F_{i,j}$.

Step D3: calculating an average value for each of the salient features to obtain the predicted value of corresponding class (Softmax), i.e., $$pred = \frac{\left[e^{g(F_0)}, e^{g(F_1)}, \ldots, e^{g(F_i)}, \ldots, e^{g(F_{C-1})}\right]^T}{\sum_{i=0}^{C-1} e^{g(F_i)}}.$$

Step D4: calculating a multi-classification cross-entropy for the obtained predicted value of N classes to obtain the depth feature discrimination loss $L_{dis}(F)$, i.e., $$L_{dis}(F) = L_{CE}(y, \text{pred}),$$

wherein $L_{CE}$ represents a classification cross-entropy loss function, which is calculated using a real classy and a model prediction class pred.

Step III: calculation of the feature diversity loss function. Through this step, the depth features obtained through the convolutional neural network can be differentiated, comprising:

A: feature value normalizing step: performing Softmax on channels of each of the depth features obtained in step I to obtain normalized features;

B: normalized feature saliency fusing step: taking maximum values at same positions of each group of normalized features to obtain normalized salient features corresponding to each group of normalized features;

C: calculating of the feature diversity loss function: summing the values of each group of features after the normalized feature saliency fusion to obtain the saliency of the group (i.e., only one feature is left in each group), and summing the saliencies of the plurality of groups of features to obtain a feature diversity loss.

Further, the functional calculation of the feature diversity loss comprises:

Step C1: performing Softmax on channels of each of the depth features obtained in step I to obtain normalized features $F_i$, i.e., $$F_i = \frac{e^{F_{i,k'}}}{\sum_{k=1}^{WH} e^{F_{i,k}}};$$

wherein $F_{i,k}$ represents a value at position k of a depth feature of an i-th class; $F_{i,k}$, represents a depth feature belonging to the i-th class or group;

Step C2: through the normalized feature saliency fusion (CCMP), taking maximum values of $F_i$ at relative positions of different feature maps to obtain the salient features corresponding to each group of features, i.e., $$F_i = \max_{j=1,2,\ldots,\xi} \frac{e^{F_{i,k'}}}{\sum_{k=1}^{WH} e^{F_{i,k}}},$$

wherein j represent a position on a feature map; then, values of respective positions in the feature map are added up to obtain the saliency (Sum) of each group of features:

$$h(F_i) = \sum_{k=1}^{WH} \max_{j=1,2,\ldots,\xi} \frac{e^{F_{i,k'}}}{\sum_{k=1}^{WH} e^{F_{i,k}}};$$

Step C3: averaging the saliency of each group of features, to obtain the feature diversity loss $L_{div}(F)$, i.e., $$L_{div}(F) = \frac{1}{c}\sum_{i=0}^{c-1} h(F_i).$$

Step IV: calculating of the model optimization loss function, comprising:

A: calculating the multi-classification cross-entropy loss of the depth features;

B: weighted fusing the multi-classification cross-entropy loss, the feature discrimination loss and the feature diversity loss to obtain a model optimization loss function;

Further, the calculation of the model optimization loss function comprises:

Step B1: taking the depth features as an input of a fully connected layer, and constraining high-dimensional semantic features of the depth features to obtain a cross-entropy loss function $L_{CE}(F)$.

Step B2: weighted fusing the feature discriminative loss $L_{dis}(F)$, the feature diversity loss $L_{div}(F)$ and the cross-entropy loss function $L_{CE}(F)$ to obtain the model optimization loss function Loss(F), i.e., $$\text{Loss}(F) = L_{ce}(F) + \mu L_{dis}(F) - \lambda L_{div}(F)$$

wherein $\mu$ and $\lambda$ represent multipliers, such as non-negative multipliers.

Further, the model optimization loss function is obtained, i.e., more and better local or regional features of the input image are obtained through the feature discrimination loss and the feature diversity loss, which is important to well solve the task of fine-grained image classification.

Referring to FIG. 5, in the first row, the shaded area is a model attention area, and it can be seen that the model of the present disclosure pays attention to the detailed features of an object in the image, such as the head, feet, abdomen and wings of a bird; in the second row, it indicates that the obtained shadow area is substantially consistent if only step III (i.e., step II is removed) is used, which means that the depth features obtained by the model have lost diversity; meanwhile, in the second row, it indicates that only one of the shadow areas obtained is valid if only step II (i.e., step III is removed) is used, which means that the depth features obtained by the model have lost discrimination. Particularly, the first column is the original image, the second to fourth columns are the obtained three depth feature maps, and the fifth column is the fusion of the feature maps of the second to fourth columns.

In the present disclosure, one of the factors such as the large intra-class difference, the small inter-class difference and the great influence of background noise of the fine-grained images is comprehensively considered, and through the feature discrimination loss function, the feature images belonging to each class are constrained to be discriminative and have the features of corresponding class, thus reducing the intra-class difference, decreasing the learning difficulty and learning better discriminative features. Through the new feature diversity loss function, the feature maps belonging to each class are constrained to have diversity, thus increasing the inter-class difference, further decreasing the model learning difficulty and learning more different features. Based on the above two points, the present disclosure obtains more features which are more discriminative in the fine-grained image classification task, thus achieving beneficial effects. As compared with the existing methods, it is more targeted, better in effect, and easy for practical deployment. The present disclosure fully considers characteristics of fine-grained image classification, and obviously improves the effect of multiple fine-grained image classification tasks.

Figure 7:
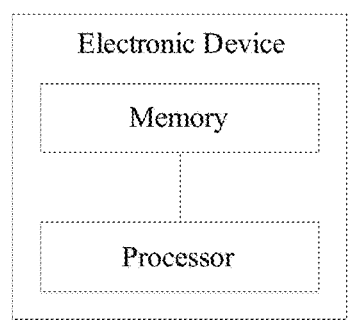
FIG. 7 is a schematic structural diagram of an electronic device according to an embodiment of the present disclosure.

In addition, the embodiments of the present disclosure further provide an electronic device, as shown in FIG. 7, which comprises a memory, a processor and a computer program stored in the memory and executable on the processor, wherein the processor implements the steps of the method described in any of the above embodiments when executing the program.

The embodiments of the present disclosure further provide a computer readable storage medium, on which a computer program is stored, and when the program is executed by a processor, the steps of the method described in any of the above embodiments are implemented.

Those described above are only preferred embodiments of the present disclosure. It should be appreciated that the above embodiments are only described to help understanding of the method and its core idea of the present disclosure, rather than limiting the protection scope of the present disclosure. Any modification, equivalent substitution, etc. made within the idea and the principle of the present disclosure should fall within the protection scope of the present disclosure.

The invention claimed is:

1. A fine-grained image recognition method, comprising:
forming a feature extraction network based on a network structure of convolutional neural network, by pre-training weights on a training dataset; inputting an input image into the feature extraction network to obtain corresponding depth features;
dividing the depth features into a set number of groups, and randomly discarding depth features of a set proportion in each group of depth features; taking maximum values of the remaining depth features in each group of depth features at corresponding positions to obtain salient features corresponding to each group of depth features; averaging all elements of each of the salient features to obtain predicted values of corresponding classes; and calculating a multi-classification cross-entropy for the obtained predicted values to obtain a depth feature discrimination loss;
performing a softmax on respective channels of each of the depth features to obtain normalized depth features; taking maximum values at corresponding positions of each group of normalized depth features to obtain normalized salient features corresponding to each group of normalized depth features; summing values of each group of normalized salient features to obtain a diversity of the group of normalized salient features; averaging the diversities of a plurality of groups of normalized salient features to obtain a feature diversity loss;
calculating a multi-classification cross-entropy loss of the depth features; and weighted fusing the multi-classification cross-entropy loss, the depth feature discrimination loss and the feature diversity loss to obtain a model optimization loss function;
training a model comprising the feature extraction network and a classifier network using the model optimization loss function to obtain a fine-grained image recognition model; and using the fine-grained image recognition model to perform an image recognition on an image to be recognized to obtain a class recognition result.

2. The fine-grained image recognition method according to claim 1, wherein the training dataset is an ImageNet dataset.

3. The fine-grained image recognition method according to claim 1, wherein the set number of groups is equal to a total number of classes in the training dataset.

4. The fine-grained image recognition method according to claim 1, wherein the set proportion is equal to one half.

5. The fine-grained image recognition method according to claim 1, wherein the convolutional neural network comprises one of VGG, ResNet and Densenet.

6. The fine-grained image recognition method according to claim 5, further comprising:
fine-tuning the convolutional neural network to make the convolutional neural network be adaptive to a fine-grained classification task of an image of a set class.

7. The fine-grained image recognition method according to claim 3, wherein the depth features are feature maps.

8. The fine-grained image recognition method according to claim 7, wherein randomly discarding depth features of a set proportion in each group of depth features comprises:
randomly discarding feature maps of a set proportion from the depth features corresponding to each class in the grouped depth features through a random attention mechanism.

9. The fine-grained image recognition method according to claim 7, wherein taking maximum values of the remaining depth features in each group of depth features at corresponding positions to obtain salient features corresponding to each group of depth features comprises:
taking maximum values of the remaining depth features in each group of depth features at corresponding positions in different feature maps, and averaging maximum values at respective corresponding positions of the depth features in all the feature maps in the remaining depth features in each group of depth features to obtain salient features of each group of depth features.

10. The fine-grained image recognition method according to claim 7, wherein summing values of each group of normalized salient features to obtain a diversity of the group of normalized salient features comprises:
adding up the values of respective positions in the feature map in each group of normalized depth features to obtain a diversity of each group of normalized depth features.

11. The fine-grained image recognition method according to claim 1, wherein averaging the diversities of a plurality of groups of normalized salient features to obtain a feature diversity loss comprises:
averaging the diversities of all the groups of normalized salient features to obtain a feature diversity loss.

12. The fine-grained image recognition method according to claim 1, wherein the classifier network is a fully connected layer;
calculating a multi-classification cross-entropy loss of the depth features comprises:
taking the depth features as an input of the fully connected layer, and constraining high-dimensional semantic features of the depth features to obtain a multi-classification cross-entropy loss.

13. The fine-grained image recognition method according to claim 8, wherein
after discarding the feature maps of a set proportion in the depth features corresponding to each class, the remaining depth features in each group of depth features are represented as:

$$F'_i = M_i \cdot F_i,$$

$$M_i = \mathrm{diag}(\mathrm{Mask}_i),$$

wherein $F_i$ represents a depth feature belonging to an i-th class or group, and $F'_i$ represents a remaining depth feature in each group of depth features $F_i$; $M_i$ represents an intermediate variable, $\mathrm{Mask}_i$ is a mask matrix containing only 0 and 1 which are randomly distributed; $\mathrm{Mask}_i \in R^\xi$, $R^\xi$ represents a real vector of $\xi$ dimensions; and $\mathrm{diag}()$ is a matrix operation that converts a vector into a diagonal matrix.

14. The fine-grained image recognition method according to claim 13, wherein the mask matrix $Mask_1$ comprises $$\left\lfloor \frac{\xi}{2} \right\rfloor$$

zeros and $$\left\lceil \frac{\xi}{2} \right\rceil$$

ones.

15. The fine-grained image recognition method according to claim 9, wherein
the salient features of each group of depth features are represented as:

$$g(F_i) = \frac{1}{WH} \sum_{k=1}^{WH} \max_{j=1,2,\ldots,\xi} F'_{i,j,k},$$

wherein $g(F_i)$ represents a salient feature of each group of depth features $F_i$, $F'_{i,j,k}$ represents a value at position k in the feature map labeled as j in the depth features of an i-th class, $\xi$ represents the number of feature maps assigned to each class, and $$\max_{j=1,2,\ldots,\xi}$$

represents taking a maximum value among values $F'_{i,j,k}$ with j as a variable, W and H represent the width and the height of each of the depth features respectively, and WH represents that W and H are multiplied;
the predicted value is represented as:

$$pred = \frac{\left[e^{g(F_0)}, e^{g(F_1)}, \ldots, e^{g(F_i)}, \ldots e^{g(F_{c-1})}\right]^T}{\sum_{i=0}^{c-1} e^{g(F_i)}},$$

wherein pred represents the predicted value, c represents a total number of classes in the training dataset, and T represents a transposition operation;
the depth feature discrimination loss is represented as:

$$L_{dis}(F) = L_{CE}(y, pred)$$

wherein $L_{dis}(F)$ represents a depth feature discrimination loss, $L_{CE}$ represents a multi-classification cross-entropy loss, y represents a real class, and $L_{CE}(y, pred)$ represents that $L_{CE}$ is obtained from y and pred.

16. The fine-grained image recognition method according to claim 10, wherein
the normalized depth features are represented as:

$$F''_i = \frac{e^{F_i}}{\sum_{k=1}^{WH} e^{F_{i,k}}},$$

wherein $F''_i$ represents the normalized depth feature, $F_i$ represents the depth feature belonging to an i-th class or group, and $F_{i,k}$ represents a value at position k of the depth feature of the i-th class;
the obtained normalized salient features are represented as:

$$\tilde{F}_i = \max_{j=1,2,\ldots,\xi} F''_{i,j},$$

wherein $\tilde{F}_i$ represents a normalized salient feature, j represents the label of a feature map in each group of normalized depth features $F_i$, $F''_{i,j}$ represents the j-th feature map in the normalized depth feature $F''_i$ of an i-th class, $\xi$ represents the number of feature maps assigned to each class, and $$\max_{j=1,2,\ldots,\xi}$$

represents taking a maximum value among the values $F''_{i,j}$ with j as a variable;
the diversity of each group of normalized depth features is represented as:

$$h(F_i) = \Sigma_{k=1}^{WH} \tilde{F}_{i,k},$$

wherein $h(F_i)$ represents a diversity of each group of normalized depth features $F_i$, and $\tilde{F}_{i,k}$ represents a value at position k in the normalized salient feature $\tilde{F}_i$ of the i-th class;
the feature diversity loss is represented as:

$$L_{div}(F) = \frac{1}{c} \sum_{i=0}^{c-1} h(F_i),$$

wherein $L_{div}(F)$ represents a feature diversity loss, and c represents a total number of classes in the training dataset.

17. The fine-grained image recognition method according to claim 1, wherein,
the model optimization loss function is represented as:

$$Loss(F) = L_{ce}(F) + \mu L_{dis}(F) - \lambda L_{div}(F),$$

wherein F represents the depth feature, $L_{CE}(F)$ represents the multi-classification cross-entropy loss, $L_{dis}(F)$ represents the depth feature discrimination loss, $L_{div}(F)$ represents a feature diversity loss, Loss(F) represents the model optimization loss function, and $\mu$ and $\lambda$ represent the non-negative multipliers.

18. An electronic device, comprising a memory, a processor and a computer program stored in the memory and executable on the processor, wherein the processor implements the steps of the method according to claim 1 when executing the program.

19. A non-transitory computer readable storage medium, on which a computer program is stored, and when the program is executed by a processor, the steps of the method according to claim 1 are implemented.

* * * * *